(12) United States Patent
Bruno

(10) Patent No.: US 10,323,339 B2
(45) Date of Patent: Jun. 18, 2019

(54) AIRCRAFT BRAKE DISC MATERIALS AND METHODS

(71) Applicant: Goodrich Corporation, Charlotte, NC (US)

(72) Inventor: Claudio Bruno, Glastonbury, CT (US)

(73) Assignee: GOODRICH CORPORATION, Charlotte, NC (US)

( * ) Notice: Subject to any disclaimer, the term of this patent is extended or adjusted under 35 U.S.C. 154(b) by 592 days.

(21) Appl. No.: 14/668,463

(22) Filed: Mar. 25, 2015

(65) Prior Publication Data

US 2016/0281268 A1  Sep. 29, 2016

(51) Int. Cl.
| | |
|---|---|
| *H01B 1/04* | (2006.01) |
| *B32B 9/00* | (2006.01) |
| *D01F 9/12* | (2006.01) |
| *C04B 41/87* | (2006.01) |
| *C04B 35/628* | (2006.01) |
| *C04B 35/83* | (2006.01) |
| *C04B 41/00* | (2006.01) |
| *C04B 41/50* | (2006.01) |
| *F16D 69/02* | (2006.01) |
| *C04B 111/00* | (2006.01) |

(52) U.S. Cl.
CPC .......... *D01F 9/12* (2013.01); *C04B 35/62855* (2013.01); *C04B 35/62857* (2013.01); *C04B 35/62884* (2013.01); *C04B 35/62886* (2013.01); *C04B 35/83* (2013.01); *C04B 41/009* (2013.01); *C04B 41/507* (2013.01); *C04B 41/5041* (2013.01); *C04B 41/87* (2013.01); *F16D 69/023* (2013.01); *C04B 2111/00362* (2013.01); *C04B 2111/00982* (2013.01); *C04B 2235/3232* (2013.01); *C04B 2235/3813* (2013.01); *C04B 2235/44* (2013.01); *C04B 2235/444* (2013.01); *C04B 2235/5256* (2013.01); *C04B 2235/614* (2013.01); *C04B 2235/616* (2013.01); *H01B 1/04* (2013.01)

(58) Field of Classification Search
CPC ........ Y10T 428/30; C02B 31/022; H01B 1/04
USPC ....................... 428/408; 423/447.1
See application file for complete search history.

(56) References Cited

U.S. PATENT DOCUMENTS

| | | | |
|---|---|---|---|
| 5,962,135 A | 10/1999 | Walker et al. | |
| 6,857,509 B1 * | 2/2005 | Braiato | F16D 65/0006 188/218 XL |

FOREIGN PATENT DOCUMENTS

| | | |
|---|---|---|
| DE | 3622437 | 10/1987 |
| EP | 0507564 | 10/1992 |

(Continued)

OTHER PUBLICATIONS

Extended European Search Report dated Jul. 22, 2016 in European Application No. 16161656.0.

(Continued)

*Primary Examiner* — Daniel H Miller
(74) *Attorney, Agent, or Firm* — Snell & Wilmer L.L.P.

(57) ABSTRACT

The present disclosure provides methods related to infiltration of aircraft brake discs with titanium-containing compounds. In various embodiments, a method of making a self-coating carbon/carbon composite member may comprise infiltrating a carbonized fiber preform with a titanium-containing compound, drying the carbonized fiber preform, annealing the carbonized fiber preform at a third temperature, and densifying the carbonized fiber preform.

9 Claims, 3 Drawing Sheets

(56) References Cited

FOREIGN PATENT DOCUMENTS

| EP | 1748036 | 1/2007 |
|----|---------|--------|
| FR | 2893939 | 6/2007 |
| FR | 2967170 | 5/2012 |
| JP | 04805539 | 11/2011 |
| KR | 1334431 | 11/2013 |
| WO | 2005012744 | 2/2005 |
| WO | 2006115755 | 11/2006 |

OTHER PUBLICATIONS

Kim, et al., "Preparation of TiB2/C Composites in a CVI Reactor," Key Engineering Materials, vol. 334-335, 2007, pp. 329-332.
Bates et al. "Synthesis of titanium boride(TiB)2 nanocrystallites by solution-phase processing." J. Mater, Res., vol. 10, No. 10, Oct. 1995. p. 2599-2612. Materials Research Study, 1995.
Gu et al. "A Mild Solvothermal Route to Nanocrystalline Titanium Diboride." Journal of Alloys and Compounds. Nov. 2003. p. 325-327. Elsevier Science B.V., (2002).
European Patent Office, European Search Report dated Jan. 3, 2018 in Application No. 16161656.0-1354.
European Patent Office, European Office Action dated Feb. 5, 2019 in Application No. 16161656.0.

* cited by examiner

AIRCRAFT BRAKE DISC MATERIALS AND METHODS

FIELD OF THE DISCLOSURE

The present disclosure relates to aircraft brake disc materials and methods, and more particularly, to titanium infiltrated brake disc materials and methods.

BACKGROUND OF THE DISCLOSURE

Carbon fiber parts, such as carbon/carbon parts ("C/C") in the form of friction discs are commonly used for vehicle brake discs, including aircraft brake discs, automotive racing brake and clutch discs, and the like. C/C brake discs are especially useful in such applications because of the superior high temperature characteristics of C/C material. In particular, the C/C material used in C/C parts is a good conductor of heat and thus is able to dissipate heat away from the braking surfaces that is generated in response to braking. C/C material is also highly resistant to heat damage and is thus capable of sustaining friction between brake surfaces during severe braking, without a significant reduction in the friction coefficient or mechanical failure. However, limitations of traditional C/C material include the limited wear life of the C/C material and the tendency to oxidize at high temperatures.

SUMMARY OF THE DISCLOSURE

In various embodiments, the present disclosure provides methods of making self-coating C/C composite members, comprising infiltrating a carbonized fiber preform with a titanium-containing compound, drying the carbonized fiber preform, annealing the carbonized fiber preform at a third temperature, and densifying the carbonized fiber preform to obtain a self-coating C/C composite member. In various embodiments, a method may comprise infiltrating a C/C composite member (e.g., a densified carbonized fiber preform) with a titanium-containing compound, drying the C/C composite member, and annealing the C/C composite member at a third temperature to obtain a self-coating C/C composite member. In various embodiments, the titanium-containing compound may comprise titanium diboride. In various embodiments, the titanium-containing compound may comprise titanium dioxide. In various embodiments, ordinary wear of the self-coating C/C composite member may cause formation of a protective coating by oxidation of titanium diboride.

In various embodiments, the present disclosure provides self-coating C/C composite members having a titanium-containing compound deposited therein. In various embodiments, the titanium-containing compound may comprise titanium diboride. In various embodiments, the titanium-containing compound may comprise titanium dioxide. In various embodiments, ordinary wear of the self-coating C/C composite member may cause formation of a protective coating by oxidation of titanium diboride.

BRIEF DESCRIPTION OF THE DRAWINGS

The accompanying drawings are included to provide a further understanding of the present disclosure and are incorporated in, and constitute a part of, this specification, illustrate various embodiments, and together with the description, serve to explain the principles of the disclosure.

DETAILED DESCRIPTION

Figure 1:
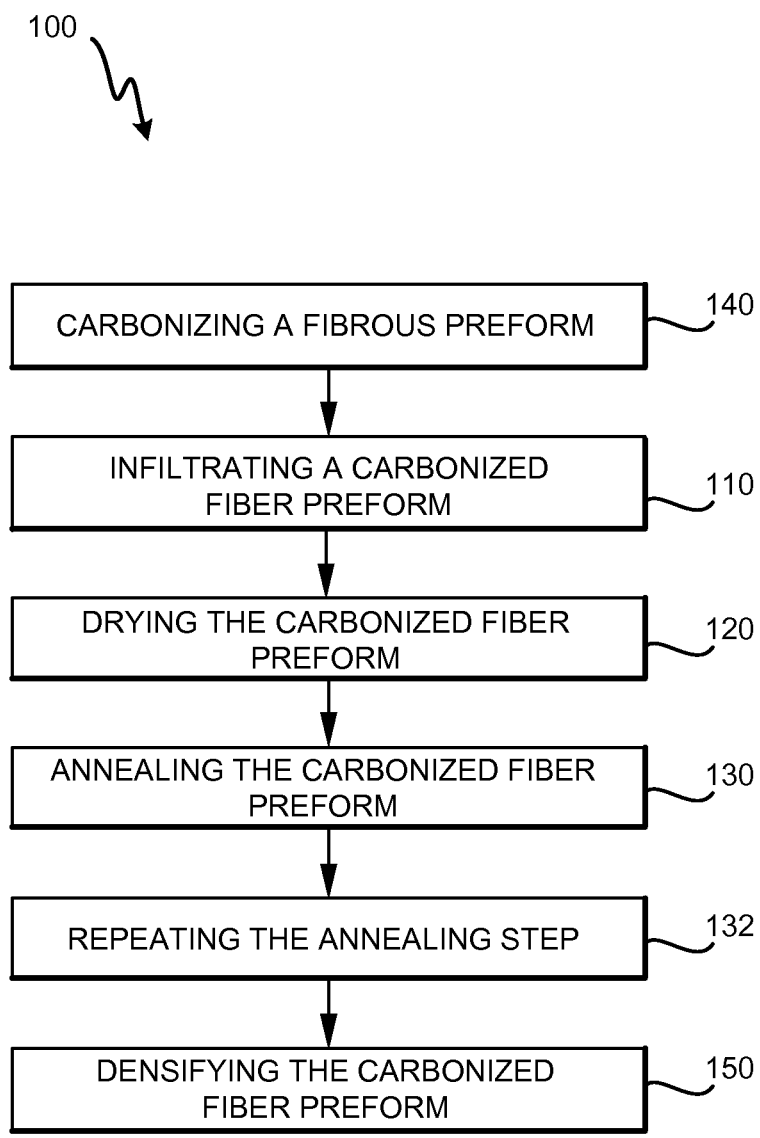
FIG. 1 illustrates a method of making a self-coating C/C composite member in accordance with various embodiments.

The detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that logical, chemical, and mechanical changes may be made without departing from the spirit and scope of the disclosure. Thus, the detailed description herein is presented for purposes of illustration only and not of limitation.

For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected, or the like may include permanent, removable, temporary, partial, full, and/or any other possible attachment option. Additionally, any reference to without contact (or similar phrases) may also include reduced contact or minimal contact.

For example, in the context of the present disclosure, devices may find particular use in connection with aircraft brake discs. However, various aspects of the disclosed embodiments may be adapted for optimized performance with a variety of brake discs, including automobile brake discs and various other motor vehicle brake discs. As such, numerous applications of the present disclosure may be realized.

In general, C/C parts produced using the oxidized PAN fiber, carbonization, and CVI densification method are made in successive manufacturing steps. First, a fibrous preform is made utilizing a variety of textile manufacturing techniques. In general, there are currently two primary methods of manufacturing C/C materials. The first method involves the layup and cure of a carbon fiber, phenolic resin matrix composite, followed by pyrolysis and subsequent phenolic resin infiltration and pyrolysis cycles. Multiple resin infiltration and pyrolysis cycles are typically used until the part achieves the desired density. The second method involves fabrication of an oxidized polyacrylonitrile (PAN) fiber ("OPF") or fibrous preform, followed by carbonization and chemical vapor infiltration (CVI) densification. The chemical vapor infiltration cycles are continued, in conjunction with machining the preform between infiltration cycles if warranted, until the desired part density is achieved. Combinations of these two basic process methods are also in use and may include variations in preform architecture, infiltration resin type, and chemical vapor infiltration conditions.

Typically, the fibrous preform is formed by superimposing a number of fibrous layers on top of each other. The fibrous layers are usually made from OPF. The fibrous layers may be made in a variety of ways and may include discrete (staple) or continuous fibers, unidirectional or cross-layered fibers or braided structures. The fibrous layers may also be preprocessed in various ways, such as pre-needling processes, to make the fibrous layers more coherent.

Preferably, the fibrous layers are placed on top of each other. After each fibrous layer is placed on top of the stack of fibrous layers, the stack is needled. Needling pulls fibers from the in-plane direction and forces them into the z direction, thus decreasing in-plane fiber content which may reduce high-energy friction performance and in-plane mechanical strength in the final composite. In general, the needling process has the effect of interlocking the individual fabric layers together. Thus, after needling, the fibrous preform has fibers extending in three different directions (i.e., in the x and y directions in the plane of the fibrous layers and the z direction perpendicular to the fibrous layers).

After the fibrous preform is made, it is carbonized to convert the OPF into carbon fibers, resulting in a carbonized fiber preform. Typically, fibrous preforms are carbonized by placing the preforms in a furnace with an inert atmosphere. In general, the carbonization process involves heating the fibrous preforms in a furnace to a temperature greater than about 1,600 degrees Celsius (2912 Fahrenheit). Typically, an inert atmosphere of nitrogen, argon or a vacuum is provided in the furnace during the carbonization process. The heat of the furnace causes a chemical conversion of the OPF that converts the fibers to carbon fibers and drives off other chemicals. Although it is preferred that the fibers in the carbonized fiber preform be 100% carbon fiber, it is generally acceptable for a less than full conversion to take place. The resulting carbonized fiber preform generally has the same fibrous structure as the fibrous preform before carbonizing. During carbonization, the total mass and the total fiber volume in each fibrous preform is typically reduced due to the loss of non-carbon compounds. In further embodiments, compressive pressure may be applied to the fibrous preforms during the carbonization process to increase the fiber volume ratio of the fibrous preforms after carbonization, but without changing the z-fiber content.

Carbonized fiber preforms prepared with carbon fiber tows or ceramic fiber tows typically exhibit a wide range of porosity including very small pores. The pore size and pore volume of the porous structure (e.g., carbonized preform) should be sufficient to permit a gas and/or liquid to infiltrate the pores under reaction conditions and form a solid residue or matrix therein as a result of thermal decomposition or, in general, chemical reactions.

After the fibrous preform has been carbonized, the carbonized fiber preform is densified. In general, densification involves filling the voids, or pores, of the fibrous preform with additional carbon material. This may be done using the same furnace used for carbonization or a different furnace. Typically, chemical vapor infiltration and deposition ("CVI/CVD") techniques are used to densify the porous carbonized fiber preform with a carbon matrix. This commonly involves heating the furnace and the carbonized fibrous preforms, and flowing hydrocarbon gases into the furnace and around and through the carbonized fibrous preforms. As a result, carbon from the hydrocarbon gases separates from the gases and is deposited on and within the carbonized fibrous preforms. When the densification step is completed, the resulting C/C composite member part has a carbon fiber structure with a carbon matrix infiltrating the fiber structure, thereby deriving the name "carbon/carbon."

Prior or subsequent to the step of densification, an infiltration step may be carried out. As one may appreciate, a carbonized fiber preform (e.g., a fibrous preform that has not been densified) may be desired to be infiltrated with another material to alter the material properties of the final product, such as a brake disc. Similarly, a C/C composite member (e.g., a carbonized fiber preform that has been densified) may be desired to be infiltrated with another material to alter the material properties of the final product, such as a brake disc. For instance, the density, temperature tolerance, coefficient of friction, tendency to resist oxidation, strength, and other factors of the final brake disc may be altered and/or enhanced. Without infiltration, C/C composite members such as aircraft brake discs may oxidize and experience wear as a result of high heat and friction during use. Infiltration of a carbonized fiber preform or a C/C composite member with a titanium-containing compound may result in a self-coating C/C composite member. A self-coating C/C composite member may resist wear and may resist oxidation by forming a protective layer as a result of the titanium-containing compound's exposure to high heat.

Thus, a self-coating C/C composite member and method for making the same is disclosed. With reference to FIG. 1, in various embodiments, a method 100 of making a self-coating C/C composite member may comprise infiltrating a carbonized fiber preform with a titanium-containing compound at a first temperature (Step 110). In various embodiments, infiltration of a titanium-containing compound into or onto a carbonized fiber preform may be accomplished using chemical vapor infiltration (CVI), melt infiltration (MI), and slurry casting (SC), alone or in various combinations. In various embodiments, infiltration may partially or fully infiltrate the carbonized fiber preform with a titanium-containing compound.

Figure 2:
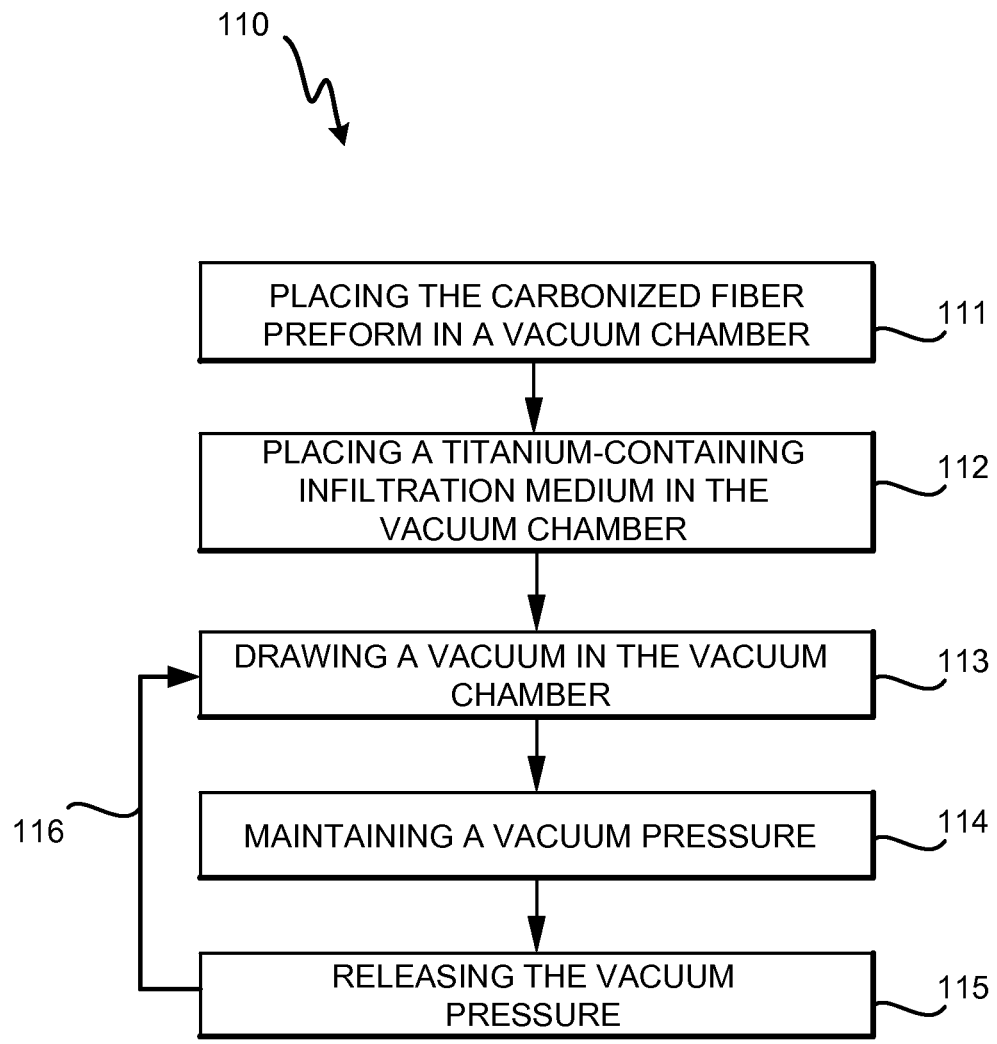
FIG. 2 illustrates a method of infiltrating an aircraft brake disc in accordance with various embodiments.

In various embodiments and with reference to FIG. 2, infiltration (Step 110) may comprise placing a carbonized fiber preform in a vacuum chamber (Step 111) and placing a titanium-containing infiltration medium in the vacuum chamber (Step 112). Titanium-containing infiltration medium may comprise the titanium-containing compound. In various embodiments, titanium-containing infiltration medium may or may not comprise a solution. In various embodiments, the titanium-containing compound may comprise titanium diboride, and the titanium-containing infiltration medium may comprise a nonethereal solution. As used herein, the term "nonethereal" refers to a solution free or substantially free of oxygen-containing compounds and/or free or substantially free oxygen molecules. For example, in various embodiments, the titanium-containing infiltration medium may comprise sodium borohydride ($NaBH_4$) and/or titanium tetrachloride ($TiCl_4$) in a solution of 1,2-dimethoxyethane ("DME"). In various embodiments, the titanium-containing infiltration medium may comprise metallic sodium (Na), amorphous boron (B), and titanium tetrachloride ($TiCl_4$) in a solution of benzene. In still further embodiments, the titanium-containing infiltration medium may comprise a suspension of sodium borohydride ($NaBH_4$) in liquid phase titanium tetrachloride ($TiCl_4$).

In various embodiments, the titanium-containing compound may comprise titanium diboride and the titanium-containing infiltration medium may comprise at least one of an aqueous solution or alcohol solution. In various embodiments, the titanium-containing compound may comprise titanium dioxide and the titanium-containing infiltration medium may comprise at least one of an aqueous solution or a short chain alcohol solution, such as methanol, ethanol, isopropanol, or the like. For example, in various embodiments, the titanium-containing infiltration medium may comprise sodium borohydride ($NaBH_4$) and titanium tetrachloride ($TiCl_4$) in an aqueous solution. For example, in various embodiments, the titanium-containing infiltration medium may comprise sodium borohydride ($NaBH_4$) and titanium tetrachloride ($TiCl_4$) in an alcohol solution.

In various embodiments, infiltration (Step 110) may further comprise drawing a vacuum in the vacuum chamber (Step 113). In various embodiments, the vacuum pressure may comprise about 15 mmHg (133 Pa). In various embodiments, the first vacuum pressure may comprise any desired vacuum pressure.

In various embodiments, infiltration (Step 110) may further comprise maintaining a vacuum pressure for a duration of time at a first temperature (Step 114) and releasing the vacuum pressure from the vacuum chamber (Step 115). In various embodiments, the duration of time in which the vacuum pressure is maintained may comprise a period of approximately 30 minutes. In various embodiments, the duration of time in which the vacuum pressure is maintained may comprise a period of approximately 8 hours. However, the first duration of time may comprise different durations depending upon the selected titanium-containing infiltration medium, titanium-containing compound, and desired level of infiltration.

In various embodiments, the first temperature may comprise ambient temperature. In various embodiments, the first temperature may comprise about 164° C. For example, in various embodiments, sodium borohydride ($NaBH_4$) and titanium tetrachloride ($TiCl_4$) in a solution of DME may form intermediate $Ti(BH_4)_3(DME)$, which may undergo thermal decomposition in the presence of refluxing mesitylene at 164° C., forming titanium diboride precursor molecules. In various embodiments, the first temperature may comprise about 400° C. For example, in various embodiments, metallic sodium (Na), amorphous boron power (B), and titanium tetrachloride ($TiCl_4$) in a solution of benzene may form titanium diboride when heated to about 400° C. for about 8 hours.

In various embodiments, infiltration (Step 110) may further comprise repeating (Step 116), any suitable number of times the drawing a vacuum in the vacuum chamber, the maintaining a vacuum pressure, and the releasing the vacuum pressure. In various embodiments, repeating (Step 116) may increase the quantity or uniformity of titanium-compounds deposited in the carbonized fiber preform.

In various embodiments and with reference again to FIG. 1, method 100 may further comprise drying the carbonized fiber preform (Step 120). In various embodiments, the drying step may comprise circulating air and/or an inert gas over the infiltrated carbonized fiber preform. In various embodiments, the drying step may be performed at a second temperature. In various embodiments, the second temperature may be less than the boiling temperature of the solution titanium-containing infiltration medium at the ambient pressure under which the process is being performed. However, the second temperature may be any suitable temperature suitable for substantially and/or completely removing the solvent of the titanium-containing infiltration medium. For example, in various embodiments, drying of a carbonized fiber preform infiltrated with an aqueous or alcoholic solution of sodium borohydride ($NaBH_4$) and titanium tetrachloride ($TiCl_4$) may result in precipitation and/or deposition of titanium diboride in the carbonized fiber preform. For example, in various embodiments, drying of a carbonized fiber preform infiltrated with an aqueous or alcoholic solution of sodium borohydride ($NaBH_4$) and titanium tetrachloride ($TiCl_4$) may result in precipitation and/or deposition of titanium dioxide in the carbonized fiber preform.

In various embodiments, method 100 may further comprise annealing the carbonized fiber preform at a third temperature (Step 130). In various embodiments, the third temperature may comprise about 900° C. to about 1100° C., wherein the term about in this context only refers to +/−20° C. For example, in various embodiments, annealing of titanium diboride precursor molecules at a third temperature may yield titanium diboride nanocrystals. For example, in various embodiments, annealing at a third temperature may cause the reaction of sodium borohydride ($NaBH_4$) with titanium tetrachloride ($TiCl_4$), yielding titanium diboride, sodium chloride, hydrogen gas, and hydrogen chloride. In such embodiments, sodium chloride may be removed from the carbonized fiber preform by sublimation. In various embodiments, annealing may be repeated any suitable number of times (Step 132).

In various embodiments, method 100 may further comprise carbonizing the fibrous preform (Step 140) as previously discussed. Subsequently, in various embodiments, method 100 may further comprise densifying the carbonized fiber preform (Step 150) as previously discussed.

In various embodiments, infiltration of a carbonized fiber preform with titanium-containing compounds may increase the density of a C/C composite member above commercially acceptable density of 1.80 g/cm³ (+/−about 0.10 g/cm³). In various embodiments, infiltration of a carbonized fiber preform with titanium-containing compounds may decrease the total processing time and/or number of process cycles required to reach a commercially acceptable density of 1.80 g/cm³ (+/−about 0.10 g/cm³).

In various embodiments, the infiltration step may occur prior to the carbonization and densification steps. In various embodiments, the infiltration step may occur between the carbonization and densification steps. In various embodiments, the infiltration step may occur subsequent to the carbonization and densification steps.

Typically, C/C composite members are commonly used in the form of aircraft brake discs. Such brake discs are subject to high friction and high temperatures during use, causing degradation and/or oxidation of the C/C composite at adjacent wear surfaces of the brake discs. Further, chemicals used during operation of aircraft runways may cause further degradation and/or oxidation of the C/C composite at wear surfaces of the brake discs.

In various embodiments, infiltration of a carbonized fiber preform with titanium-containing compounds may facilitate generation of a protective coating on the wear surfaces of an aircraft brake disc. For example, in various embodiments, titanium diboride may oxidize to form diboron trioxide ($B_2O_3$) in response to a fourth temperature. In various embodiments, oxidation of titanium diboride may form a glassy, protective layer comprising diboron trioxide ($B_2O_3$) on the wear surfaces of an aircraft brake disc. In various embodiments, oxidation of titanium diboride may form a protective layer comprising titanium dioxide ($TiO_2$) on the wear surfaces of an aircraft brake disc.

In various embodiments, the fourth temperature may be about 1000° C., wherein the term about in this context only refers to +/−20° C. In various embodiments, the fourth temperature may be less than 1000° C. In various embodiments, diboron trioxide ($B_2O_3$) may prevent and/or decrease oxidation and/or degradation of the carbonized fiber preform. In various embodiments, titanium dioxide ($TiO_2$) may prevent and/or decrease oxidation and/or degradation of the carbonized fiber preform. In various embodiments, as the wear surfaces of aircraft brake discs erode by friction, the protective layer may be degraded, exposing subsurface portions of the carbonized fiber preform and deposited titanium diboride therein. In various embodiments, exposure of subsurface titanium diboride may allow further oxidation of titanium diboride and further generation of a protective layer comprising diboron trioxide ($B_2O_3$) and/or titanium dioxide ($TiO_2$). In this way, in various embodiments, a C/C composite member infiltrated with titanium diboride may be described as "self-coating."

Figure 3:
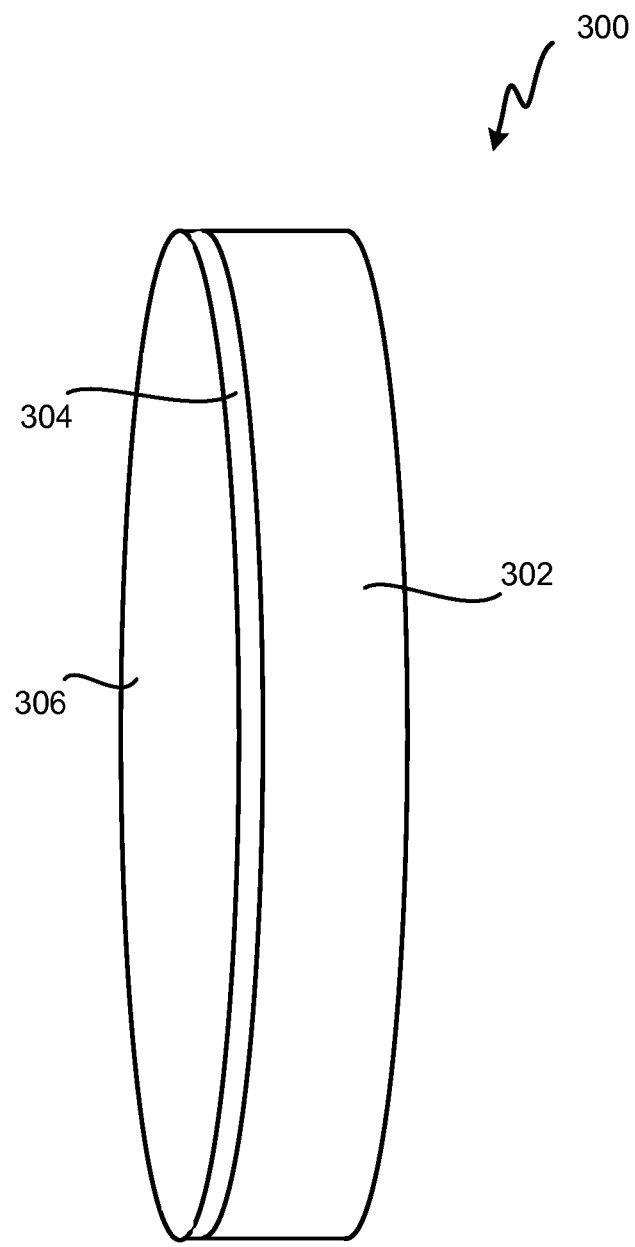
FIG. 3 illustrates a self-coating C/C composite member in accordance with various embodiments.

In various embodiments and with reference to FIG. 3, a self-coating C/C composite member 300 may comprise a carbonized fiber preform densified with a carbon matrix 302, and a titanium-containing compound deposited within the C/C preform. In various embodiments, the titanium-containing compound may have been deposited within the carbonized fiber preform by a method described herein. In various embodiments, the titanium-containing compound may comprise titanium diboride. In various embodiments, the titanium-containing compound may comprise titanium dioxide.

In various embodiments, the titanium-containing compound may be disposed in pores of the carbonized fiber preform. In various embodiments, the titanium-containing compound may fill and/or seal such pores, preventing or decreasing infiltration of atmospheric air or moisture into the self-coating C/C composite member under operating conditions. In various embodiments, the titanium-containing compound may fill and/or seal such pores, preventing or decreasing infiltration into the self-coating C/C composite member of moisture under operating conditions. In various embodiments, the titanium-containing compound may fill and/or seal such pores, preventing or decreasing degradation of the self-coating C/C composite member by chemicals used during operation of aircraft runways.

In various embodiments, a protective layer 304 may be formed on a wear surface 306 of the self-coating C/C composite member in response to oxidation of the titanium diboride at a fourth temperature. In various embodiments, the protective layer may comprise diboron trioxide. In various embodiments, the protective layer may comprise titanium dioxide. In various embodiments, the fourth temperature may be about 1000° C. In various embodiments, the fourth temperature may be less than 1000° C.

In various embodiments, wear or erosion of the protective layer may expose subsurface portions of the carbonized fiber preform and deposited titanium diboride therein, leading to further formation of the protective layer by oxidation of titanium diboride.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Devices and methods are provided herein. In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A method of making a self-coating carbon/carbon composite member, comprising:
    infiltrating a carbonized fiber preform with a titanium-containing compound, wherein infiltrating the carbonized fiber preform comprises introducing, at a first temperature, an infiltration medium into the carbonized fiber preform, wherein the infiltration medium comprises sodium borohydride and titanium tetrachloride in a solution of 1,2-dimethoxyethane;
    drying the carbonized fiber preform at a second temperature;
    annealing the carbonized fiber preform at a third temperature; and
    densifying the carbonized fiber preform.

2. The method of claim 1, wherein infiltrating the carbonized preform at the first temperature comprises thermally decomposing the infiltration medium in the presence of refluxing mesitylene.

3. The method of claim 2, wherein the infiltrating comprises:
    placing the carbonized fiber preform in a vacuum chamber;
    placing the infiltration medium in the vacuum chamber;
    drawing a vacuum in the vacuum chamber;
    maintaining a vacuum pressure for a duration of time; and
    releasing the vacuum pressure from the vacuum chamber.

4. The method of claim 3, wherein the titanium-containing compound comprises titanium diboride.

5. The method of claim 3, wherein the titanium-containing compound comprises titanium dioxide.

6. The method of claim 3, wherein the infiltrating further comprises:

repeating the drawing the vacuum, the maintaining the vacuum pressure for the duration of time, and the releasing the vacuum pressure.

7. The method of claim 4, wherein the infiltration medium comprises a nonethereal solution.

8. The method of claim 4, wherein infiltrating the carbonized preform at the first temperature comprises forming titanium tetrahydroborate ("$Ti(BH_4)_3$") as an intermediate between the infiltration medium and the titanium diboride.

9. The method of claim 5, wherein the infiltration medium comprises at least one of an aqueous solution or alcohol solution.

\* \* \* \* \*